United States Patent
Bellert (10) Patent No.: US 9,865,038 B2
(45) Date of Patent: Jan. 9, 2018

(54) OFFSETTING ROTATED TABLES IN IMAGES

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 209 days.

(21) Appl. No.: 14/952,691

(22) Filed: Nov. 25, 2015

(65) Prior Publication Data

US 2017/0148140 A1 May 25, 2017

(51) Int. Cl.
| | | |
|---|---|---|
| G06K 9/46 | (2006.01) | |
| G06T 3/60 | (2006.01) | |
| G06K 9/00 | (2006.01) | |
| G06K 9/74 | (2006.01) | |
| G06K 9/32 | (2006.01) | |

(52) U.S. Cl.
CPC .......... *G06T 3/608* (2013.01); *G06K 9/00463* (2013.01); *G06K 9/3275* (2013.01); *G06K 9/4633* (2013.01); *G06K 9/74* (2013.01); *G06K 9/00456* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 5,680,478 | A * | 10/1997 | Wang ................ | G06K 9/00456 382/171 |
| 9,697,423 | B1 * | 7/2017 | Bellert .............. | G06K 9/00456 |
| 2009/0185214 | A1 * | 7/2009 | Bellert .............. | G06K 15/1806 358/1.15 |
| 2009/0245645 | A1 * | 10/2009 | Xing ................. | G06K 9/00422 382/189 |
| 2014/0029853 | A1 * | 1/2014 | Xue .................. | G06K 9/00449 382/182 |
| 2015/0147003 | A1 * | 5/2015 | He ................... | G06T 3/60 382/296 |
| 2017/0013173 | A1 * | 1/2017 | Bellert ............. | H04N 1/6025 |
| 2017/0148140 | A1 * | 5/2017 | Bellert ............. | G06T 3/608 |

* cited by examiner

*Primary Examiner* — Iman K Kholdebarin
(74) *Attorney, Agent, or Firm* — Osha Liang (57) ABSTRACT

A method for image processing, including: obtaining an image including a table; identifying a first line corresponding to the table in the image, a first confidence value for the first line, and a first angle for the first line; initiating a plurality of angle bins corresponding to multiple angles; calculating, based on the first confidence value, a first plurality of bin values for a first subset of the plurality of angle bins within a window surrounding the first angle; adding the first plurality of bin values to the first subset of the plurality of angle bins; identifying an angle bin of the plurality of angle bins having a maximum bin value; and rotating the image based on the angle bin having the maximum bin value.

20 Claims, 6 Drawing Sheets

Image
306

FIG. 3A

Hand-drawn
Table
308

Image
(Following conversion
to mask)
310

FIG. 3B

Image
(Following Hough
transform)
312

FIG. 3C

Selected Line:
$\theta = 10$ degrees
Confidence Value = 483

W = 5
$BCV_b = W - |\theta - b| + 1$

Bin Value = $BCV_b \times 483^2$

| Angle Bin | Bin Confidence Value | Bin Value |
|---|---|---|
| 5 | 1 | 233289 |
| 6 | 2 | 466578 |
| 7 | 3 | 699867 |
| 8 | 4 | 933156 |
| 9 | 5 | 1166445 |
| 10 | 6 | 1399734 |
| 11 | 5 | 1166445 |
| 12 | 4 | 933156 |
| 13 | 3 | 699867 |
| 14 | 2 | 466578 |
| 15 | 1 | 233289 |

Image
(Following Rotation)
314

OFFSETTING ROTATED TABLES IN IMAGES

BACKGROUND

An image may include any number of tables. Further, each table may be of any size (i.e., any number of rows, any number of columns). Each cell of the table (i.e., an intersection of a row and column) may include text characters in any font, size, style, etc. The table may be hand-drawn (i.e., manually drawn by a user) or machine-generated. Within the image, the table might not be perfectly horizontal or perfectly vertical. In other words, the table may be rotated with respect to either the horizontal axis or the vertical axis. This rotation may be the result of the user manually drawing the table and/or the process (e.g., scanning) that generated the image.

Optical character recognition (OCR) is a process that identifies text characters within an image (e.g., text characters within the cell of a table). Many algorithms exist to perform OCR. However, text characters that are rotated with respect to the horizontal axis or vertical axis often frustrate the algorithms and lead to incorrect results. Regardless, users still wish to perform OCR on tables, even if the tables are rotated.

SUMMARY

In general, in one aspect, the invention relates to a method for image processing. The method comprises: obtaining an image comprising a table; identifying a first line corresponding to the table in the image, a first confidence value for the first line, and a first angle for the first line; initiating a plurality of angle bins corresponding to a plurality of angles; calculating, based on the first confidence value, a first plurality of bin values for a first subset of the plurality of angle bins within a window surrounding the first angle; adding the first plurality of bin values to the first subset of the plurality of angle bins; identifying an angle bin of the plurality of angle bins comprising a maximum bin value; and rotating the image based on the angle bin comprising the maximum bin value.

In general, in one aspect, the invention relates to a non-transitory computer readable medium (CRM) storing computer readable program code embodied therein. The program code: obtains an image comprising a table; identifies a first line corresponding to the table in the image, a first confidence value for the first line, and a first angle for the first line; initiates a plurality of angle bins corresponding to a plurality of angles; calculates, based on the first confidence value, a first plurality of bin values for a first subset of the plurality of angle bins within a window surrounding the first angle; adds the first plurality of bin values to the first subset of the plurality of angle bins; identifies an angle bin of the plurality of angle bins comprising a maximum bin value; and rotates the image based on the angle bin comprising the maximum value.

In general, in one aspect, the invention relates to a system for image processing. The system comprises: a buffer that stores an image comprising a table; a line extractor that: identifies a first line corresponding to the table in the image, a first confidence value for the first line, and a first angle for the first line; and identifies a second line corresponding to the table in the image, a second confidence value and a second angle for the second line; an angle bin engine comprising a plurality of bins that: calculates, based on the first confidence value, a first plurality of bin values for a first subset of the plurality of angle bins within a window surrounding the first angle; calculates, based on the second confidence value, a second plurality of bin values for a second subset of the plurality of angle bins within the window surrounding the second angle; and adds the first plurality of bin values to the first subset of the plurality of angle bins and the second plurality of bin value to the second subset of the plurality of angle bins; and a table engine that rotates the image based on the angle bin comprising a maximum bin value.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for image processing. An image including a table is obtained and converted into a mask. As the table may be hand-drawn, the table might not be perfectly horizontal or vertical and/or the table might not have perfectly straight lines. Multiple lines within the image and corresponding to the table are identified, and each of the identified lines has an angle and a confidence value. For each line, bin values are calculated for angle bins within a window surrounding the angle of the line. The image is rotated based on the angle bin having the maximum bin value. Following the rotation, the table is closer to being horizontal and/or vertical, improving the results of any optical character recognition (OCR) algorithms that operate on the image.

Figure 1:
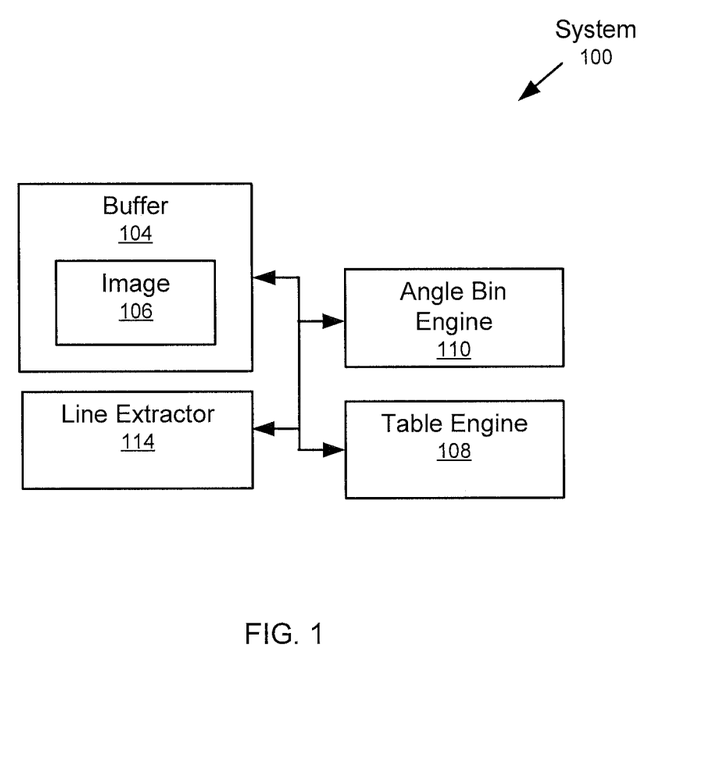
FIG. 1 shows a system in accordance with one or more embodiments of the invention.

FIG. 1 shows a system (100) in accordance with one or more embodiments of the invention. As shown in FIG. 1, the system (100) has multiple components including, for example, a buffer (104), a line extractor (114), an angle bin engine (110), and a table engine (108). Each of these components (104, 108, 110, 114) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the system (100) includes the buffer (104). The buffer (104) may be implemented in hardware (i.e., circuitry), software, or any combination thereof. The buffer (104) is configured to store an image (106) including a table. The image (106) may be obtained (e.g., downloaded) from any source. Further, the image (106) may be of any size and in any format (e.g., JPEG, GIF, BMP, PNG, etc.).

In one or more embodiments, the table in the image (106) is hand-drawn. Accordingly, the table might not be perfectly horizontal or perfectly vertical. In other words, the table may be rotated with respect to the horizontal and/or vertical axis. Further, the lines of the table might not be perfectly straight. In one or more embodiments, the table is machine-generated. However, even in such embodiments, the table may be rotated with respect to the horizontal or vertical axis because of distortions introduced by the process (e.g., scanning) that generated the image (106). The table may have any number of rows and columns. Further, each cell of the table may have text and/or graphics.

In one or more embodiments of the invention, the system (100) includes the line extractor (114). The line extractor (114) may be implemented in hardware (i.e., circuitry), software, or any combination thereof. The line extractor (114) identifies straight lines in the image, an angle for each line (e.g., with respect to the horizontal or vertical axis), and a confidence value for each line (i.e., the number of pixels in the image that contribute to the line). In one or more embodiments of the invention, the line extractor (114) applies the Hough Transform to the image (106) to identify the lines, the angles of the lines, and the confidence values of the lines. In one or more embodiments of the invention, the line extractor (114) converts the image (106) to a mask (e.g., a binary image) before identifying lines in the image (106) to improve the line identification process.

In one or more embodiments of the invention, the line extractor (114) discards lines that fail to meet one or more criteria. For example, the confidence value of a line may be compared with a threshold, and the line may be discarded if the confidence value is below the threshold. The threshold may be computed as a percentage P of the average confidence value of the most confident N lines. In other words, the average confidence value is computed for the N lines with the highest confidence values, and any line with a confidence value less than P of that average confidence value is discarded. For example, P may equal 50%, and N may equal 10.

In one or more embodiments of the invention, the system (100) includes the angle bin engine (110). The angle bin engine (110) may be implemented in hardware (i.e., circuitry), software, or any combination thereof. The angle bin engine (110) is configured to initialize a set (e.g., array) of angle bins, with each angle bin corresponding to an angle. Initializing the angle bins may include setting all angle bins to zero or another constant. The number of angle bins in the set (i.e., the cardinality of the set of angle bins) is dependent on the angular resolution of the transform (e.g., Hough Transform) used to identify the lines. The transform might only look for lines with angles in increments of this angular resolution. The angular resolution may be a runtime input parameter to the transform. For example, if the angular resolution of the transform is 1 degree, there are 180 possible angles and thus 180 angle bins (i.e., 0 degrees to 179 degrees).

Those skilled in the art, having the benefit of this detailed description, will appreciate that hand-drawn tables are seldom drawn with perfect lines at 0 and 90 degrees. For any angle of an identified line detected by the applied transform, the identified line could have been drawn at an angle within a window surrounding the identified angle. In other words, if the transform detects a line at θ degrees, the line could have actually been anywhere from θ−W degrees to θ+W degrees. For example, W may be 5 degrees, and thus the window effectively extends 5 degrees in both directions from θ (i.e., the angle of the identified line).

In one or more embodiments of the invention, the angle bin engine (110) calculates, for each identified line, a bin confidence value for each angle bin from θ−W degrees to θ+W degrees. The bin confidence value decreases the further away from θ. This translates to a high degree of confidence that the identified line was drawn at θ, and the lowest degree of confidence that the identified line was drawn at θ−W degrees or θ+W degrees. In one or more embodiments of the invention, the bin confidence value for angle bin b ($BCV_b$) is calculated by:

$$BCV_b = W - |\theta - b| + 1$$

As shown in the above equation, the difference between angle bin b and the angle of the line is a factor of $BCV_b$. Those skilled in the art, having the benefit of this detailed description, will appreciate that in the middle of the window where b=θ, the BCV is W+1. In contrast, at the edge of the window where b=θ±W, the BCV is 1.

In one or more embodiments of the invention, the angle bin engine (110) calculates, for each identified line, bin values for each angle bin within the window surrounding the angle of the identified line. In one or more embodiments, the bin value for angle bin b is calculated as:

$$\text{Bin value for angle bin } b = BCV_b \times (\text{confidence value of identified line})^2$$

Those skilled in the art, having the benefit of this detailed description, will appreciate that by squaring the confidence value of the line, more weight is given to stronger lines and the possible effects of many lines with relatively low confidence values is counteracted. The bin values are added to their respective angle bins and the process repeats for all identified lines that are not discarded.

In one or more embodiments of the invention, the system (100) includes the table engine (108). The table engine (108) may be implemented in hardware (i.e., circuitry), software, or any combination thereof. The table engine (108) is configured to identify the angle bin having the maximum bin value. It is deemed that the table in the image (106) is rotated by this angle bin (e.g., 10 degrees). The table engine (108) rotates the image (106), and thus rotate the table, based on this angle bin to render the table approximately horizontal or vertical (i.e., approximately aligned with the horizontal or vertical axis). This effectively offsets the rotation introduced by the user while hand-drawing the table and/or the rotation introduced during the scanning process that generated the image (106). The table engine (108) is also configured to perform OCR on the image to extract the text within the cells of the table. As the table is now better aligned with the horizontal and/or vertical axis, the likelihood of the OCR being successful (i.e., correctly identifying/extracting text characters) has increased.

Although the system (100) is shown as having four components (104, 108, 110, 114), in other embodiments of the invention, the system (100) may have more or fewer components. Further, the functionality of each component described above may be split across components.

Figure 2:
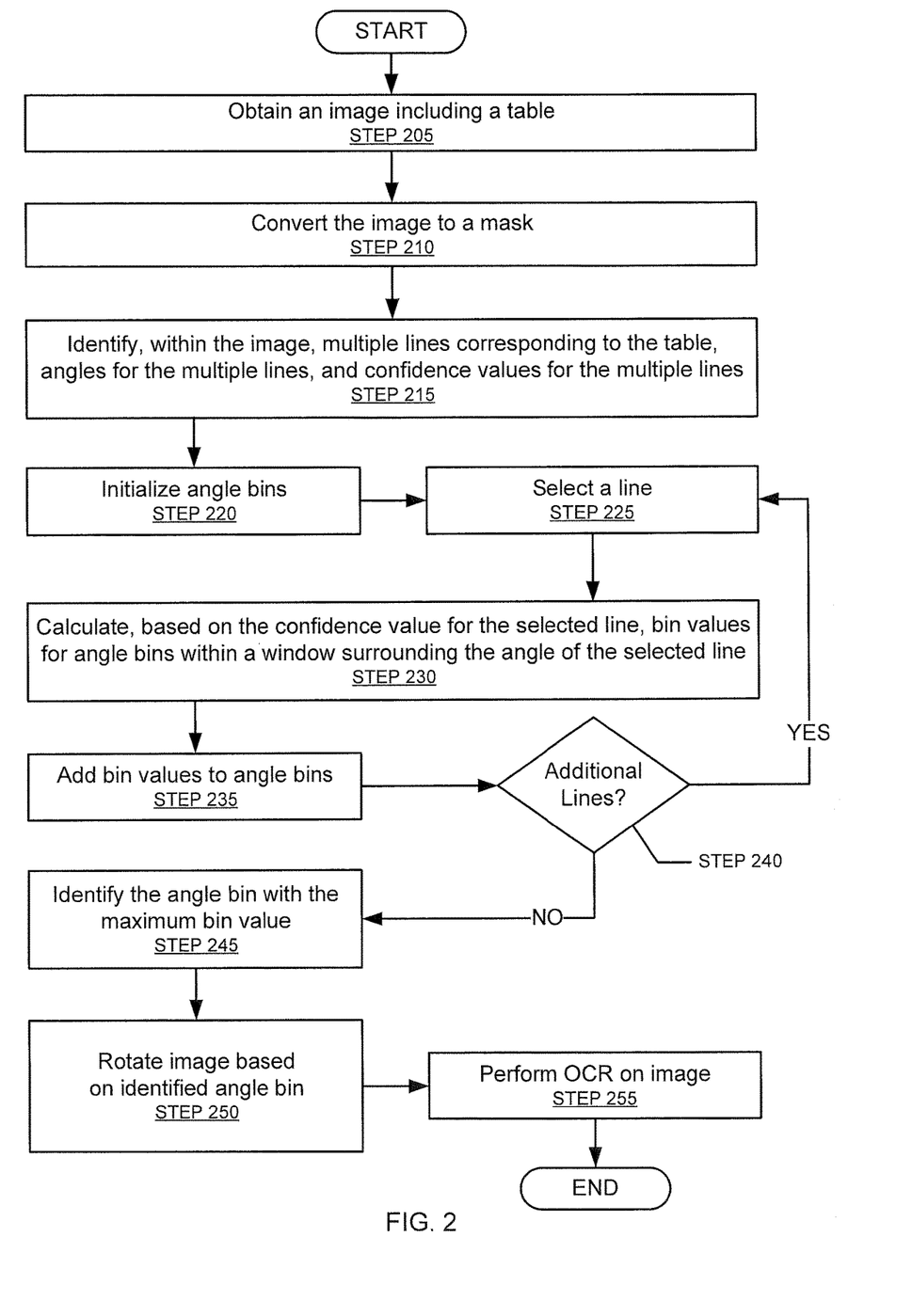
FIG. 2 shows a flowchart in accordance with one or more embodiments of the invention.

FIG. 2 shows a flowchart in accordance with one or more embodiments of the invention. The flowchart depicts a process for image processing. Specifically, the flowchart depicts a process for rotating a hand drawn table to be approximately horizontal or vertical. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an image including a table is obtained (STEP 205). The image may be obtained (e.g., downloaded) from any source. The image may be generated by a scanning a hardcopy document. The image may be of any size or format. In one or more embodiments, the table in the image is hand-drawn. Accordingly, the table might not be perfectly horizontal or perfectly vertical. In other words, the table may be rotated with respect to the horizontal and/or vertical axis. Further, the lines of the table might not be perfectly straight. In one or more embodiments, the table is machine-generated. However, even in such embodiments, the table may be rotated with respect to the horizontal or vertical axis because of distortions introduced by the scanning process that generated the image. The table may have any number of rows and columns. Further, each cell of the table may have text and/or graphics.

In STEP 210, the image is converted into a mask. In other words, the image is converted to a binary image. Pixels corresponding to the lines of the table and/or the text characters in the cells may be set to 1, while all remaining pixels are set to 0.

In STEP 215, lines within the image corresponding to the table are identified. The angle of each line (e.g., with respect to the horizontal or vertical axis) and a confidence value for each line (i.e., the number of pixels in the image that contribute to the line) are also identified. In one or more embodiments of the invention, the lines, the angles of the lines, and the confidence values of the lines are identified by applying the Hough Transform to the image. Other transforms may also be used to identify the lines.

In one or more embodiments of the invention, lines that fail to meet one or more criteria are discarded. For example, the confidence value of a line may be compared with a threshold, and the line may be discarded if the confidence value is below the threshold. The threshold may be computed as a percentage P of the average confidence value of the most confident N lines. In other words, the average confidence value is computed for the N lines with the highest confidence values, and any line with a confidence value less than P of that average confidence value is discarded.

In STEP 220, angle bins are initialized. Each angle bin corresponds to an angle. Initializing the angle bins may include setting all angle bins to zero or another constant. The number of angle bins in the set (i.e., the cardinality of the set of angle bins) is dependent on the angular resolution of the transform used to identify the lines (STEP 215). The transform might only look for lines with angles in increments of this angular resolution. The angular resolution may be a runtime input parameter to the transform. For example, if the angular resolution of the transform is 1 degree, there are 180 possible angles and thus 180 angle bins (i.e., 0 degrees to 179 degrees).

In STEP 225 one of the lines is selected. Specifically, a line that has not yet been selected is selected. The line may be randomly selected. Additionally or alternatively, the line with the highest confidence value or the lowest confidence value may be selected. Additionally or alternatively, the line with the smallest angle or the largest angle may be selected.

In STEP 230, bin values are calculated for angle bins within a window surrounding the angle of the selected line. The bin values are calculated based on the confidence value of the selected line. As discussed above, for any angle of an identified line detected by the applied transform, the identified line could have been drawn at an angle within a window surrounding the identified angle. In other words, if the transform detects a line at θ degrees, the line could have actually been anywhere from θ−W degrees to θ+W degrees.

In one or more embodiments of the invention, a bin confidence value for each angle bin from θ−W degrees to θ+W degrees is calculated. The bin confidence value decreases the further away from θ. In one or more embodiments of the invention, the bin confidence value for angle bin b ($BCV_b$) is calculated by:

$$BCV_b = W - |\theta - b| + 1$$

In one or more embodiments of the invention, a bin value for each angle bin within the window surrounding the angle of the identified line is calculated. In one or more embodiments, the bin value for angle bin b is calculated as:

$$\text{Bin value for angle bin } b = BCV_b \times (\text{confidence value of identified line})^2$$

In STEP 235, the bin values are added to their respective angle bins. Those skilled in the art, having this detailed description, will appreciate that because one or more steps in the process depicted in FIG. 2 repeat, the angle bins might already be storing values. In such scenarios, the bin values calculated in STEP 230 are added to the existing values stored in the angle bins (i.e., the existing values are not overwritten).

In STEP 240, it is determined whether any additional lines remain that have not been selected. When it is determined that at least one line remains, the process returns to STEP 225. When it is determined that all of the lines have been selected, the process proceeds to STEP 245.

In STEP 245, the angle bin with the maximum bin value is identified. It is deemed that the table in the image is rotated by this angle bin (e.g., 10 degrees). In STEP 250, the image (and thus the table) are rotated based on the angle corresponding to the angle bin. This effectively offsets the rotation introduced by the user while hand-drawing the table and/or the rotation introduced during the scanning process that generated the image.

In STEP 255, OCR is performed on the image to extract the text within the cells of the table. As the table is better aligned with the horizontal and/or vertical axis following the rotation, the likelihood of the OCR being successful (i.e., correctly identifying/extracting text characters) is increased.

Figure 3A:
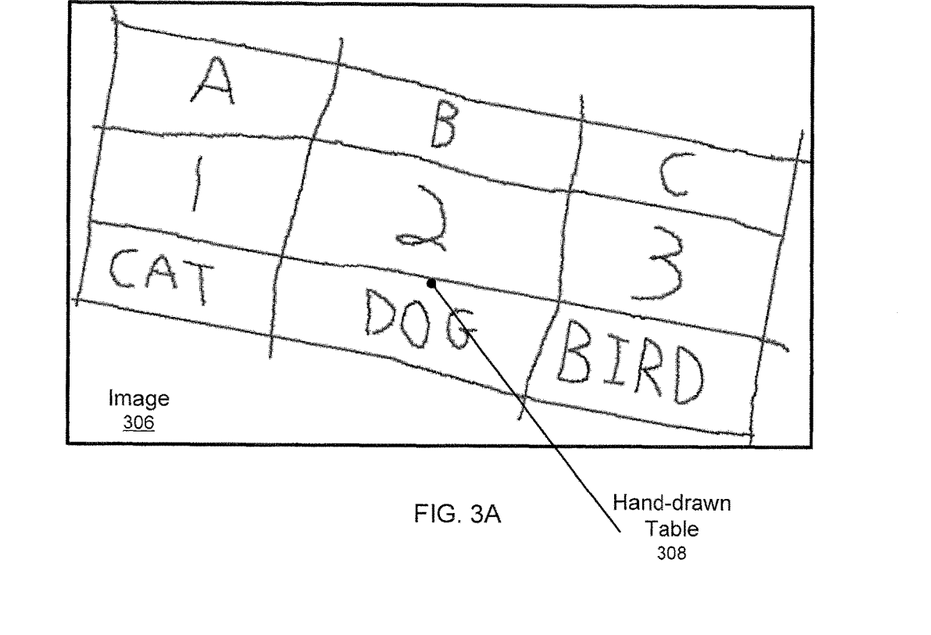
FIGS. 3A-3F show an implementation example in accordance with one or more embodiments of the invention.

FIGS. 3A-3F show an implementation example in accordance with one or more embodiments of the invention. As shown in FIG. 3A, there exists an image (306) with a hand-drawn table (308). Each cell of the table (308) includes text. The lines of the hand-drawn table (308) are not straight. Further, the hand-drawn table (308) is drawn at an angle (i.e., it is not aligned with the horizontal axis and/or vertical axis). Performing OCR on the image (306) in this orientation would likely produce poor results. In other words, the OCR algorithm might not identify/extract text in the cells of the rotated table.

Figure 3B:
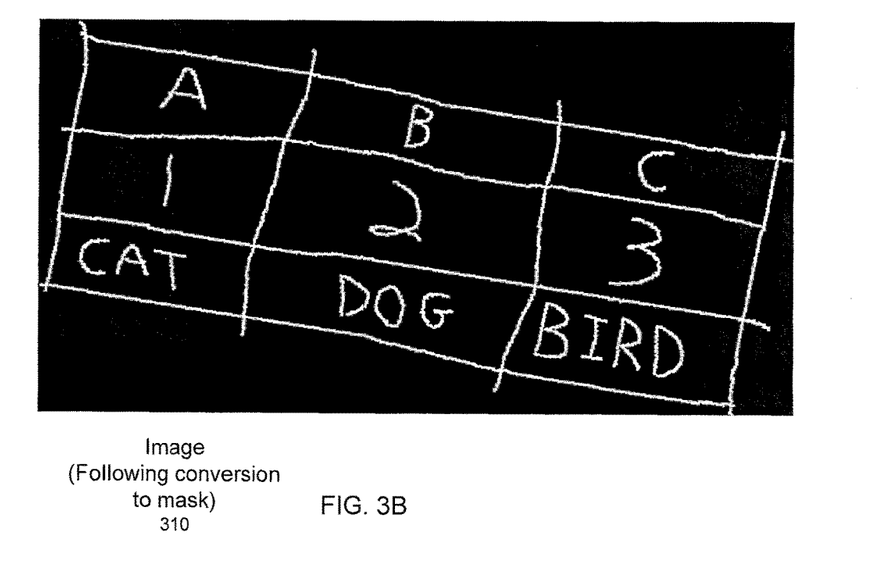

FIG. 3B shows the image (310) after it has been converted to a mask (e.g., binary image). All pixels corresponding to the lines and text characters are set to 1, while all the remaining pixels are set to zero.

Figure 3C:
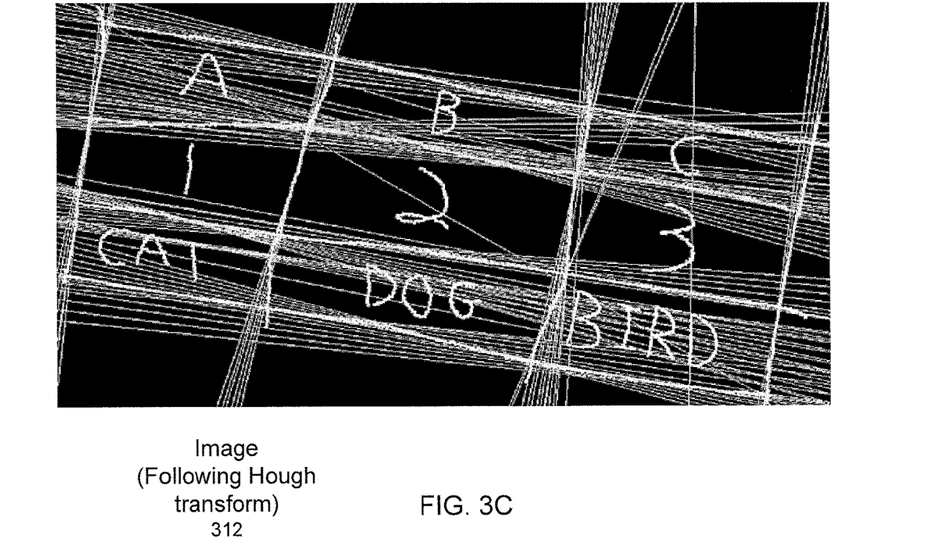

FIG. 3C shows the image (312) following the Hough transform. The Hough transform identifies multiple straight lines within the image. The Hough transform also specifies an angle (e.g., with respect to the horizontal or vertical axis) and a confidence value (i.e., the number of pixels in the image that contribute to the identified line) for each identified line. In FIG. 3C, one of the identified lines has an angle θ=10 degrees, and a confidence value of 483.

Figure 3D:
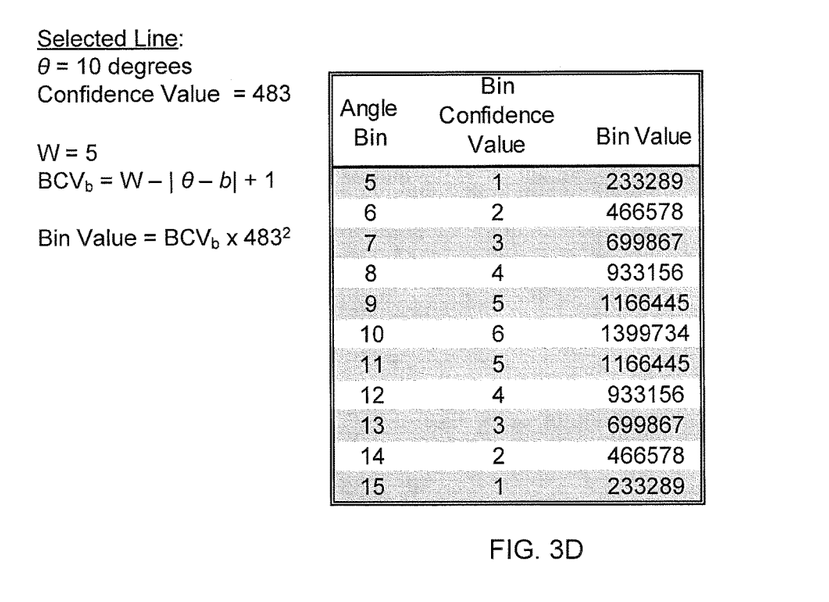

In FIG. 3D, a chart is shown with the calculated bin confidence values and the calculated bin values for the selected line having the angle θ=10 degrees, and a confidence value of 483. In this example, the window extends 5 degrees in either direction from the angle of the identified line (i.e., θ=10 degrees, W=5 degrees, θ−W=5 degrees, and θ+W=15 degrees). As shown, the bin confidence value, and thus the bin value, is the largest for the angle bin that equals the angle (θ=10 degrees) of the identified line. Similarly, the bin confidence value, and thus the bin value, is the smallest at the edges of the window (i.e., angle bin 5 degrees and angle bin 15 degrees). The bin values are added to their respective angle bins. Similar calculations are performed for all identified lines.

Figure 3E:
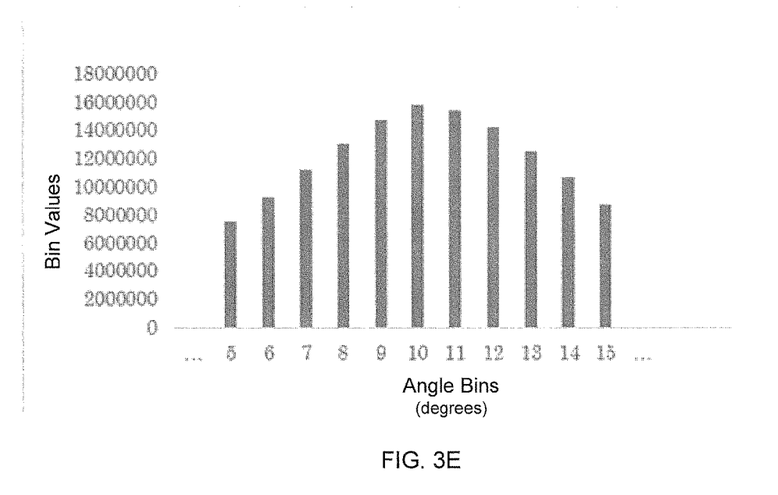

FIG. 3E shows the bin value for some of the angle bins after all the calculations are performed. As shown in FIG. 3E, +10 degrees is the angle bin having the maximum bin value. Accordingly, it is deemed that the hand-drawn table (308) is rotated by +10 degrees.

Figure 3F:
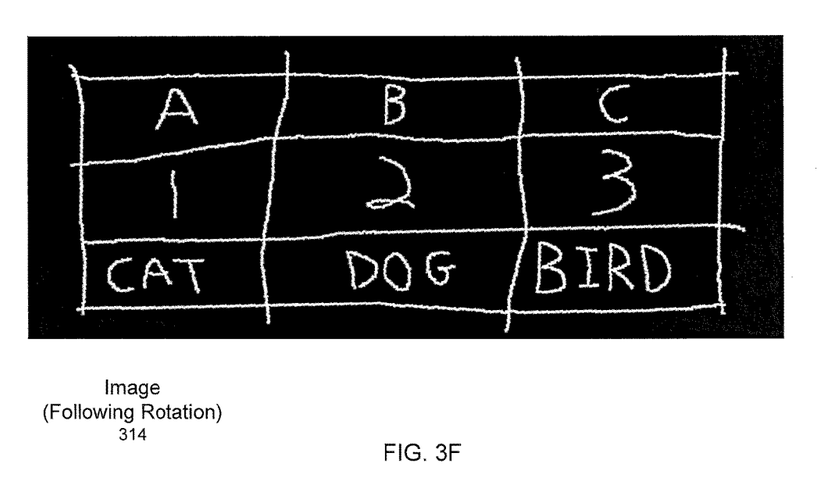

In FIG. 3F, the image (314) is rotated by −10 degrees to offset the rotation generated by the hand-drawing of the table. As shown in FIG. 3F, the table (and thus the text in the cells) is much closer to being aligned with the horizontal and the vertical axis. Accordingly, any OCR operation performed on the image is more likely to be successful in identifying/extracting text characters in the table.

One or more embodiments of the invention may have the following advantages: the ability to identify the rotation angle of a table; the ability to identify the rotation angle of the table based on identified lines within an image; the ability to process hand-drawn tables; the ability to improve the likelihood of a successful OCR operation on a rotated table; the ability to account for various confidence levels across a window of line angles; the ability to discard identified lines bases on a threshold and confidence values; etc.

Figure 4:
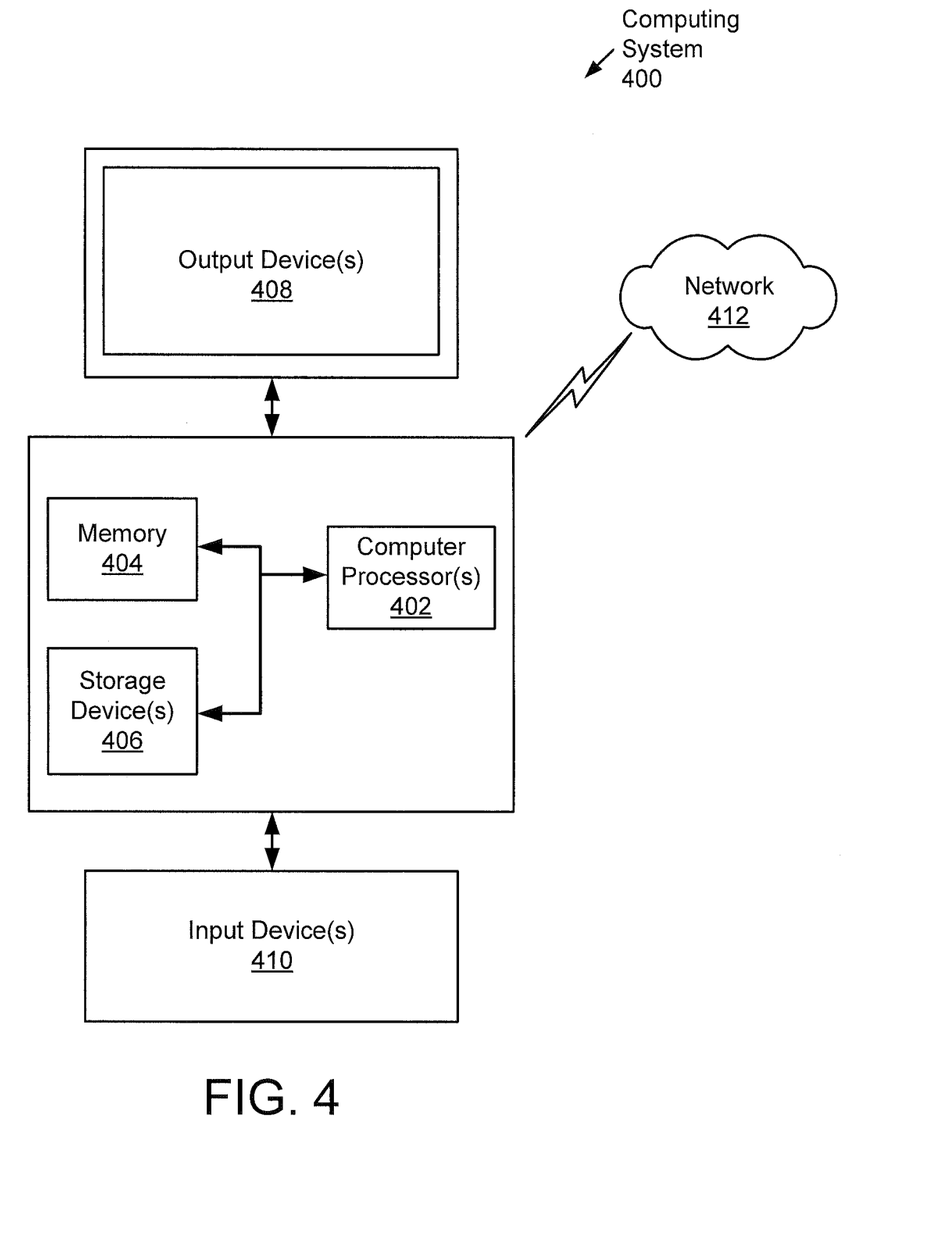
FIG. 4 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
obtaining an image comprising a table;
identifying a first line corresponding to the table in the image, a first confidence value for the first line, and a first angle for the first line;
initiating a plurality of angle bins corresponding to a plurality of angles;
calculating, based on the first confidence value, a first plurality of bin values for a first subset of the plurality of angle bins within a window surrounding the first angle;
adding the first plurality of bin values to the first subset of the plurality of angle bins;
identifying an angle bin of the plurality of angle bins comprising a maximum bin value; and
rotating the image based on the angle bin comprising the maximum bin value.

2. The method of claim 1, further comprising:
identifying a second line corresponding to the table in the image, a second confidence value for the second line, and a second angle for the second line;

calculating, based on the second confidence value, a second plurality of bin values for a second subset of the plurality of angle bins within the window surrounding the second angle; and
adding the second plurality of bin values to the second subset of the plurality of angle bins before identifying the angle bin having the maximum bin value.

3. The method of claim 2, further comprising:
identifying a third line corresponding to the table in the image, a third confidence value for the third line, and a third angle for the third line;
comparing the third confidence value with a threshold; and
discarding the third line in response to the third confidence value being below the threshold.

4. The method of claim 1, further comprising:
converting the image to a mask before identifying the first line, wherein the table is hand-drawn.

5. The method of claim 1, wherein identifying the first line, the first confidence value, and the first angle comprises applying the Hough transform to the image.

6. The method of claim 1, wherein calculating the first plurality of bin values comprises:
calculating a plurality of bin confidence values for the first subset of the plurality of angle bins,
wherein the plurality of bin confidence values are based on a size of the window and a plurality of differences between the first subset of the plurality of angle bins and the first angle; and
multiplying each of the plurality of bin confidence values with the first confidence value squared.

7. The method of claim 6, wherein the window extends 5 degrees in each direction from the first angle.

8. The method of claim 1, further comprising:
performing optical character recognition (OCR) on text within the table after rotating the image.

9. A non-transitory computer readable medium (CRM) storing computer readable program code embodied therein that:
obtains an image comprising a table;
identifies a first line corresponding to the table in the image, a first confidence value for the first line, and a first angle for the first line;
initiates a plurality of angle bins corresponding to a plurality of angles;
calculates, based on the first confidence value, a first plurality of bin values for a first subset of the plurality of angle bins within a window surrounding the first angle;
adds the first plurality of bin values to the first subset of the plurality of angle bins;
identifies an angle bin of the plurality of angle bins comprising a maximum bin value; and
rotates the image based on the angle bin comprising the maximum value.

10. The non-transitory CRM of claim 9, further storing computer readable program code embodied therein that:
identifies a second line corresponding to the table in the image, a second confidence value for the second line, and a second angle for the second line;
calculates, based on the second confidence value, a second plurality of bin values for a second subset of the plurality of angle bins within the window surrounding the second angle; and
adds the second plurality of bin values to the second subset of the plurality of angle bins before identifying the angle bin having the maximum bin value.

11. The non-transitory CRM of claim 10, further storing computer readable program code embodied therein that:
identifies a third line corresponding to the table in the image, a third confidence value for the third line, and a third angle for the third line;
compares the third confidence value with a threshold; and
discards the third line in response to the third confidence value being below the threshold.

12. The non-transitory CRM of claim 9, further storing computer readable program code embodied therein that:
converts the image to a mask before identifying the first line,
wherein the table is hand-drawn.

13. The non-transitory CRM of claim 9, wherein identifying the first line, the first confidence value, and the first angle comprises applying the Hough transform to the image.

14. The non-transitory CRM of claim 9, wherein calculating the first plurality of bin values comprises:
calculating a plurality of bin confidence values for the first subset of the plurality of angle bins,
wherein the plurality of bin confidence values are based on a size of the window and a plurality of differences between the first subset of the plurality of angle bins and the first angle; and
multiplying each of the plurality of bin confidence values with the first confidence value squared.

15. The non-transitory CRM of claim 14, wherein the window extends 5 degrees in each direction from the first angle.

16. A system for image processing, comprising:
a buffer that stores an image comprising a table;
a computer processor connected to the buffer that:
identifies a first line corresponding to the table in the image, a first confidence value for the first line, and a first angle for the first line;
identifies a second line corresponding to the table in the image, a second confidence value for the second line, and a second angle for the second line;
calculates, based on the first confidence value, a first plurality of bin values for a first subset of a plurality of angle bins within a window surrounding the first angle;
calculates, based on the second confidence value, a second plurality of bin values for a second subset of the plurality of angle bins within the window surrounding the second angle;
adds the first plurality of bin values to the first subset of the plurality of angle bins and the second plurality of bin value to the second subset of the plurality of angle bins; and
rotates the image based on the angle bin comprising a maximum bin value.

17. The system of claim 16, wherein the computer processor further converts the image to a mask before the first line is identified, and wherein the table is hand-drawn.

18. The system of claim 16, wherein calculating the first plurality of bin values comprises:
calculating a first plurality of bin confidence values for the first subset of the plurality of angle bins,
wherein the plurality of bin confidence values are based on a size of the window and a plurality of differences between the first subset of the plurality of angle bins and the first angle; and
multiplying each of the plurality of bin confidence values with the first confidence value squared.

19. The system of claim 18, wherein the window extends 5 degrees in each direction from the first angle.

20. The system of claim 16, wherein the computer processor further performs optical character recognition on text in the table after rotating the image.

* * * * *